United States Patent [19]

Koenig et al.

[11] 3,786,394
[45] Jan. 15, 1974

[54] SINGLE-BOLT JOINT FOR FEEDER AND PLUG-IN BUS DUCTS

[75] Inventors: Martin F. Koenig; George A. Dempsey, Jr., both of Milwaukee, Wis.; Manuel Issa, deceased, late of Milwaukee, Wis.; Patrick T. Sheedy, administrator, Fox Point, Wis.

[73] Assignee: Cutler-Hammer, Inc., Milwaukee, Wis.

[22] Filed: Mar. 22, 1972

[21] Appl. No.: 237,070

[52] U.S. Cl............................ 339/22 B, 174/88 B
[51] Int. Cl............................................ H01r 13/60
[58] Field of Search ............ 339/22 B, 22 R, 184 R, 339/185 R, 242; 174/68 B, 70 B, 72 B, 88 B, 99 B

[56] References Cited
UNITED STATES PATENTS

| 3,384,855 | 5/1968 | Vorgensen et al. | 339/22 B |
|---|---|---|---|
| 3,384,854 | 5/1968 | Vorgensen et al. | 339/22 B |
| 3,180,924 | 4/1965 | Rowe | 339/22 B X |

Primary Examiner—Marvin A. Champion
Assistant Examiner—Robert A. Hafer
Attorney—John W. Michael et al.

[57] ABSTRACT

A projection on one side of each splice plate of the stacked joint assembly cooperates with an open-ended, L-shaped slot in the end of the corresponding bus bar to retain the joint assembly in place during assembly of a bus duct run and also secure the bus bars from sliding within the bus duct housing. An insulated sleeve, surrounding the bolt which extends through the stacked assembly, has an oval cross section and fits into a similarly shaped central aperture in each insulator plate. Each insulator plate has at least one raised rib portion wich is concentric with its central aperture. The outer insulator plates are keyed to respective end plates, positioned on the opposite ends of the stacked assembly, by a projection fitting into an indentation in the end plate. The raised rib portion of the insulator plates cooperates with an oval aperture in the splice plates to prevent relative rotational movement therebetween, thereby insuring tbe insulator and splice plates are properly oriented for installation of the joint assembly onto a duct section.

9 Claims, 4 Drawing Figures

PATENTED JAN 15 1974

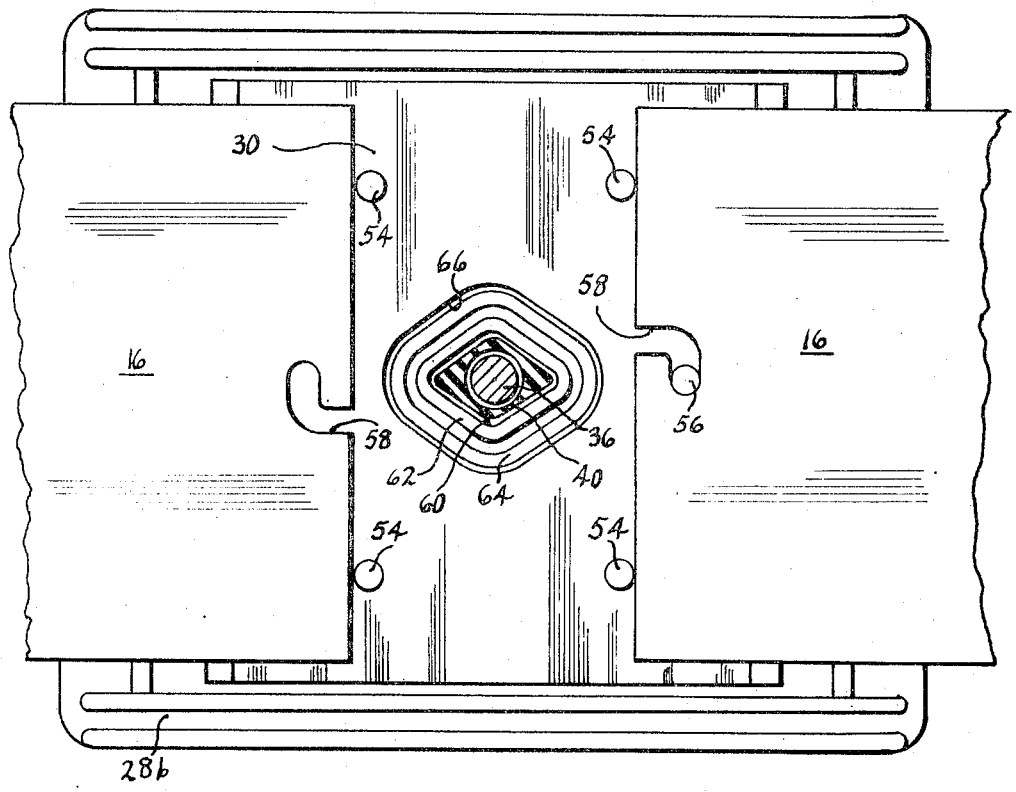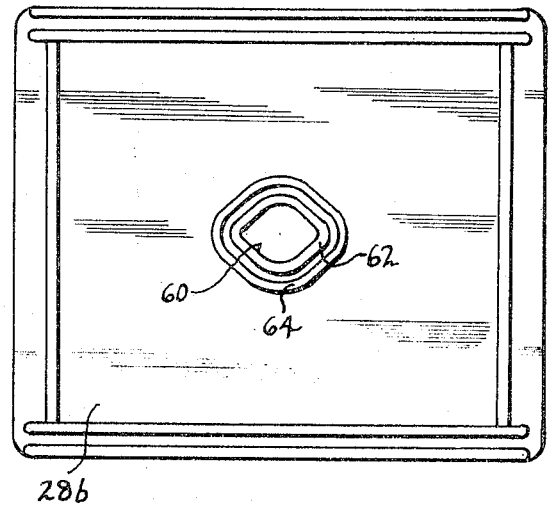

SINGLE-BOLT JOINT FOR FEEDER AND PLUG-IN BUS DUCTS

BACKGROUND OF THE INVENTION

This invention relates to electric busway assemblies and, more particularly, to joint assemblies for connecting bus duct sections together.

Busway systems are used for distribution of electrical power, particularly for higher power systems. These systems typically utilize feeder ducts which include a plurality of parallel bus bars disposed within an elongated housing. The feeder ducts are manufactured in section lengths for convenience in handling, transportation and installation. The duct sections are mounted end-to-end with the bus bars of adjacent sections being electrically connected together by a joint assembly. Also, plug-in duct sections adaptable for one or more power tap-offs can be connected to each other or to feeder duct sections in the same manner. A bus duct run usually includes several sections, so many joint connections must be made.

In order to facilitate installation and to insure a proper connection with all the bus bars, single bolt joint assemblies have been developed. These joint assemblies employ a single bolt, surrounded by an insulated sleeve, which extends through and holds a stack of adjacent pairs of conductive splice plates and interleaved insulator plates. Bus bars of the adjacent duct sections are inserted between the opposite ends of adjacent pairs of the splice plates with the bolt loosened. The bolt is then tightened to compress the assembly together and provide a tight engagement between the splice plates and corresponding bus bars. Because of manufacturing tolerances, the bolt must be quite loose during installation so there is sufficient spacing between the pairs of splice plates to permit unrestricted insertion of all the bus bars of the adjacent duct section.

During a typical installation of a bus duct run, the joint assembly is installed to one end of the bus section which is to be connected to a section previously installed. As the duct section is moved into place for connection, the loosely installed joint assembly tends to fall off unless some means is provided for retaining it to the bus bars. It is desirable that this retaining means permit the joint assembly to be removed from a duct section after installation without complete disassembly of joint members. When the through bolt is untightened for installation of the joint assembly onto a bus duct section, the splice plates and insulator plates generally are free to rotate. Consequently, they frequently become disoriented during handling and must be carefully reoriented before the joint assembly can be installed onto a duct section, thereby complicating the assembly operation. Also, the bus bars, which normally are not fastened to the duct housing, tend to shift longitudinally during handling and/or shipping.

SUMMARY OF THE INVENTION

An object of this invention is to provide a through-bolt joint assembly which is arranged so the insulator and splice plate are always properly oriented for installation onto a bus duct section.

Another object of this invention is to provide such a joint assembly which can be installed onto one end of the bus section and retained in place so it will not tend to fall off during assembly of a bus duct run.

A further object of this invention is to provide such a joint assembly which can be easily removed from a duct section without complete disassembly of the stack joint members.

A still further object of this invention is to provide a joint assembly which, when fastened to the end of a bus duct, will secure the bus bars from sliding within the duct housing.

According to this invention, the insulative sleeve means surrounding the through bolt, the central opening in the insulator plate means into which the sleeve fits, the raised rib portion on the insulator plate means adjacent to its opening, and the central opening in the splice plate means into which the rib portion of the insulator plate means fits are all provided with a non-circular shape and cooperate to prevent relative rotational movement between the splice plate means and the insulator plate means when the through bolt is untightened for installation of the joint assembly onto a bus duct. This arrangement prevents the splice plate means and insulator plate means from becoming disoriented during handling of the joint assembly.

Preferably, the joint assembly includes outer cover plates positioned on the opposite outer flat sides of the stacked plates and the insulator plate means adjacent thereto are provided with means for locking them together against relative rotational movement when the through bolt is untightened. This insures this splice plate means and the insulator plate means are always oriented with the cover plates.

In another embodiment, the bus bars are provided with an open-ended slot at their ends which cooperates with a nib on the splice plate means to restrain the joint assembly against longitudinal movement and thereby prevent it from falling off the end of a bus duct during handling and secure the bus bars from sliding longitudinally with the housing. Although capable of retaining the joint assembly in place, this arrangement permits the joint assembly to be removed after installation without completely disassembling the joint members, as is the case with many prior art arrangements.

BRIEF DESCRIPTION OF THE DRAWINGS

FIG. 3 is a top plan view of the joint assembly taken along the plane designated 3—3 in FIG. 2.

FIG. 4 is a top plan view of an insulator plate.

DESCRIPTION OF THE PREFERRED EMBODIMENT

The single-bolt joint assembly of this invention can be used for connecting feeder duct sections together, plug-in duct sections together, or connecting plug-in duct sections to feeder duct sections. For purposes of description, it will be described for connecting two feeder duct sections together.

Figure 1:
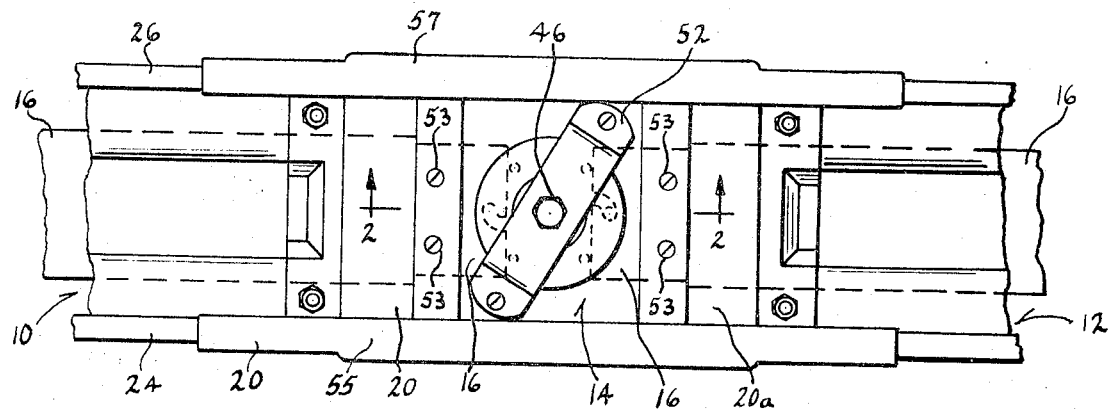
FIG. 1 is a top, plan view of the single-bolt joint assembly of this invention shown connected between feeder duct sections.
Figure 2:
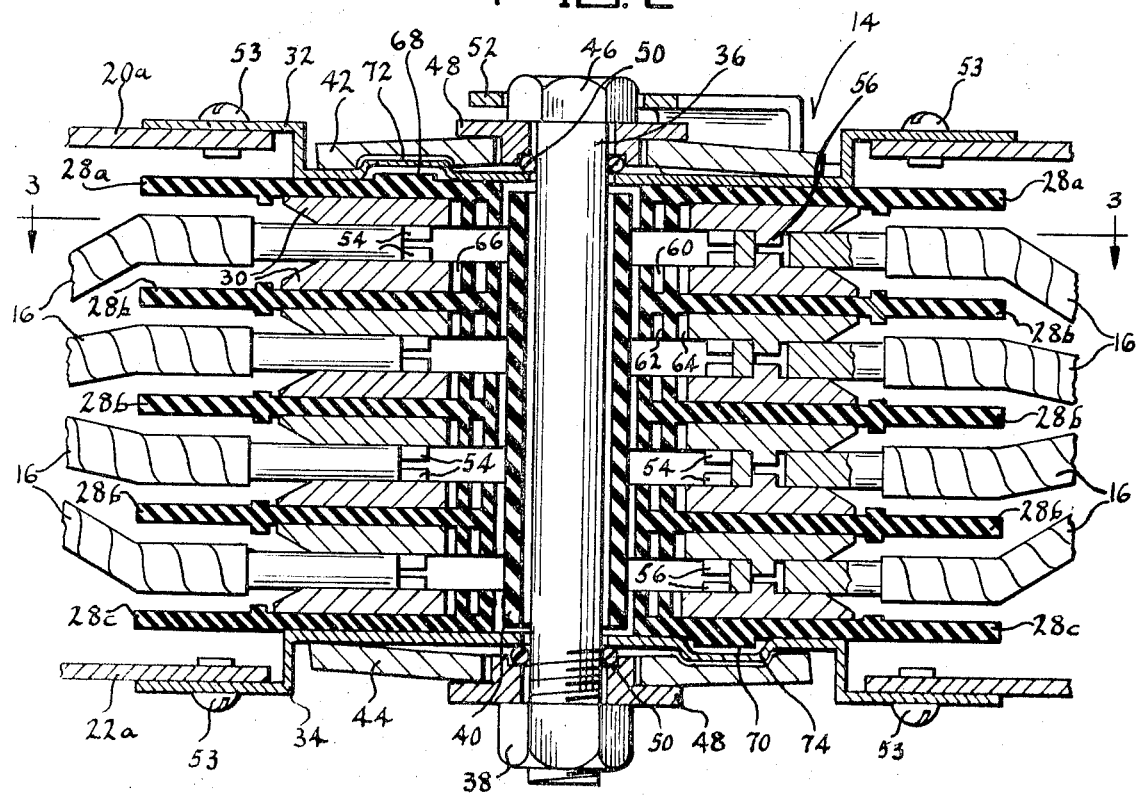
FIG. 2 is a cross sectional view of the joint assembly taken along the plane designated 2—2 in FIG. 1.

Referring to FIGS. 1 and 2, feeder duct sections 10, 12 are electrically connected together end-to-end through joint assembly 14. Feeder duct sections 10, 12, which are identically constructed, include a plurality of flat, elongated bus bars 16 disposed in an elongated housing 18. Bus bars 16 are arranged in side-by-side, sandwiched relationship within the housing, but are flared out to a spaced, parallel arrangement at each end to fit into the joint assembly. Housing 18 includes upper and lower channel assemblies 20, 22 to which a pair of side plates 24, 26 are secured in a conventional manner. U.S. Pat. No. 3,639,676, assigned to the assignee of the present invention, describes an exemplary general arrangement for the bus bars and housing.

Joint assembly 14 includes a stack of a plurality of insulator plates 28a, 28b, 28c, a plurality of adjacent pairs of conductive splice plates 30 interposed between the insulator plates, and top and bottom end plates 32, 34. The insulator, splice and end plates are all generally rectangular. The stack is held together by bolt 36 extending therethrough and nut 38 threadably mounted to the bolt. Bolt 36 is surrounded by an insulated sleeve 40 which fits inside a central aperture in each of the insulator plates. Spring washers 42, 44 are positioned beneath bolt head 46 and nut 38, respectively, adjacent to the corresponding cover plate. Bushing 48, positioned inside washers 42, 44, include an annular recess in which O-ring 50 is captured against the corresponding cover plate to provide a moisture seal.

When joint assembly 14 is installed as shown in FIG. 2, the ends of bus bar 16 of the duct sections 10, 12, respectively, extend between the opposite ends of corresponding adjacent pairs of splice plates 30. Bolt head 46 is captured by bracket 52 (which is mounted to top end plate 32) so that, by simply tightening nut 38, the stack is compressed and the splice plates are clamped into electrical engagement with the bus bars to provide an electrical connection between corresponding bus bars of sections 10, 12. The top and bottom channel assemblies 20 and 20 include brackets 20a and 20b, respectively, which are attached at their opposite ends to make the transition from the channels to end plates 32 and 34. The end plates are fastened to these brackets by tap screws 53 or the like. The sides of the joint assembly are closed by side plates 55, 57 which are moutned to duct side plates 24, 26 respectively.

As shown in FIGS. 2 and 3, each splice plate 30 has a pair of projections 54 located on either side of center which serve as limit stops for the end of the bus bars 16 as they are inserted. Nib 56, provided on one side of the splice plate 30 and spaced outwardly from stop projections 54, cooperates with open-ended, L-shaped slot 58 in the end of each bus bar 16 to retain joint assembly 14 against longitudinal movement after installation. To assemble a bus duct run, the end of joint assembly 14 with nibs 56 is first installed onto one end of duct section 12. Joint assembly 14 is initially positioned off center with respect to the bus bars so that nibs 56 are guided through the longitudinal leg of slots 58 as the splice plates are slipped over the outer ends of the bus bars. After the bus bars engage stop projections 54, joint assembly 14 is centered and nibs 56 are moved into a locked position in slots 58 as shown in FIG. 3. Thus, joint assembly is secured to the ends of duct section 12 so the duct can be moved into place for installation of the other end of joint assembly onto the end of duct section 10 without the joint assembly falling off. Even though providing an effective means for holding the joint assembly in place for installation, this arrangement permits the joint assembly to be removed from a duct section without complete disassembly of the joint stack members. Preferably, both ends of the bus bars for each duct section are provided with slots 58 so that the end joint assembly having the locking feature can be installed on either end of a duct section.

When one end of end plates 32 and 34 are fastened to respective brackets 20a, 20b by screws 53, the bus bars are prevented from shifting longitudinally by the cooperation of nibs 56 and slots 58. Thus, with a joint assembly mounted to one end, a bus duct section can be handled and/or shipped without the risk of the bus bars shifting even though bolt 36 is loosened.

As shown in FIGS. 3 and 4, insulative sleeve 40 is oval shaped and fits into an oval central aperture 60 in insulator plates 28a, 28b, 28c. Each of the inner insulator plates 28b have a raised rib portion, including a pair of ribs 62, 64 which are concentric with aperture 60 on the opposite surfaces, while outer insulator plates 28a and 28c have ribs 62, 64 only on the bottom and top surfaces, respectively. Ribs 62, 64 are arranged to provide the required over-the-surface electrical clearance between bus bars 16. The raised rib portion of the insulator plates fit into a central aperture 66 in the splice plates. As shown in FIG. 2, outer insulator plates 28a and 28b are keyed to cover plates 32, 34, respectively by projections 68, 70 which fit into small indentations 72, 74 provided in the corresponding cover plate on the opposite sides of center. Thus, the insulated sleeve, insulator plates, splice plates and over plates are interlocked to prevent relative rotational movement between the stacked parts, thereby insuring proper orientation of the insulator and splice plates for installation of the joint assembly onto the bus bars of a duct section.

From the above detailed description, it can be seen that the joint assembly of this invention can be easily installed onto a feeder duct or plug-in duct section and retained in place during assembly of bus duct run. The joint assembly can be removed, after loosening the bolt, by simply moving it laterally so that projection 56 can be guided out through the longitudinal leg of slots 58. Also, the cooperation of oval-shaped apertures of the splice plates and the outer ribs of the insulator plates insures that the stacked parts are always maintained in the proper orientation, even when the through bolt is loosened for installation of the joint assembly onto a duct section. In addition it can be seen that the bus bars are secured from sliding movement in bus way housing.

We claim:

1. In combination, a first and a second bus duct, each including a plurality of bus bars, and a joint assembly interposed said ducts and electrically connecting individual bus bars of said first duct to corresponding individual bus bars of said second duct, said joint assembly comprising a plurality of adjacent pairs of generally flat, elongated splice plate means having a first central opening and arranged in stacked relationship, the end portions of individual corresponding bus bars of said first and second ducts being interposed respective pairs of said splice plate means;

a plurality of generally flat, elongated insulator plate means having a second central opening and arranged in stacked relationship with individual ones being positioned adjacent the opposite outer sides of each pair of said splice plate means, said insulator plate means having a raised rib portion, concentric with and adjacent to said second opening, closely fitting inside said first opening;

a bolt means extending through said second opening; said bolt means when tightened urging said pair of splice plate means into contact pressure with the corrsponding bus bars to establish electrical connection therebetween; and an insulator sleeve means closely fitting inside said second opening and interposed said bolt means, said sleeve means, said rib portion and said first opening having complementary, non-circular shapes for cooperatively interlocking said splice plate means and said insulator plate means so as to prevent substantial relative rotational movement therebetween when said bolt means is sufficiently loosened to permit longitudinal movement of said bus bars relative to said splice plate means.

2. The combination according to claim 1 including a pair of end plate means positioned adjacent the opposite outer flat sides of the stack of splice plate means and insulator plate means with said bolt means extending through said end plate means; and means locking said each of end plate means to the adjacent insulator plate means so as to prevent substantial relative rotational movement therebetween when said bolt is sufficiently loosened to permit longitudinal movement of said bus bars relative to said splice plate means.

3. The combination according to claim 2 wherein said locking means comprises an outwardly extending projection on each of the insulator plate means adjacent to said end plate means, said projections being located in opposite transverse directions from the longitudinal axis of said bolt means and an indentation in each of said end plate means for accommodating the corresponding projection.

4. The combination according to claim 1 wherein said first and second openings, the outer portion of said sleeve means and said rib portions are all oval-shaped.

5. The combination according to claim 4 wherein each of said bus bars include an open-ended, L-shaped slot in the outer end portion; and at least one of each pair of said splice plate means includes a nib located transversely from the longitudinal axis of said bolt means which cooperates with said slot, when said joint assembly is installed to one end of one of said ducts, to restrain longitudinal movement of said joint assembly.

6. The combination according to claim 5 wherein at least one of said pair of splice plate means includes at least two projections transversely offset in opposite directions from the longitudinal axis of said bolt means for limiting the inward longitudinal movement of said bus bars.

7. The combination according to claim 5 including a pair of end plate means positioned adjacent the opposite outer flat sides of the stack of splice plate means and insulator plate means with said bolt extending through said end plate means;

each of said bus ducts having a housing in which said bus bars are disposed; and means for fastening the opposite ends of said end plates to respective duct housings, said nibs, slots and fastening means cooperating so that, when said joint assembly is installed to said one end of said duct, the bus bars are secured against substantial longitudinal movement with respect to said housing, even though said bolt means is sufficiently loosened to permit the insertion of bus bars between respective pairs of said spliced plate means.

8. In combination, a first and a second bus duct, each including a plurality of bus bars, and a joint assembly interposed said ducts and electrically connecting individual bus bars of said first duct to corresponding individual bus bars of said second duct, said joint assembly comprising a plurality of adjacent pairs of generally flat, elongated splice plate means having a first central opening and arranged in stacked relationship, the end portions of individual corresponding bus bars of said first and second ducts being interposed respective pairs of said splice plate means;

a plurality of generally flat, elongated insulator plate means having a second central opening and arranged in stacked relationship with individual ones being positioned adjacent the opposite outer sides of each pair of said splice plate means, said insulator plate means also having a raised rib portion, concentric with and adjacent to said second opening, closely fitting inside said first opening;

a bolt means extending through said second opening; said bolt means when tightened urging said pair of splice plate means into contact pressure with the corresponding bus bars to establish electrical connection therebetween; and an insulator sleeve means closely fitting inside said second opening and interposed said bolt means, each of said bus bars including an open-ended, L-shaped slot in the outer end portion; and at least one of each pair of said splice plate means including a nib located transversely from the longitudinal axis of said bolt which cooperates with said slot, when said joint assembly is installed to one end of one of said ducts, to restrain longitudinal movement of said joint assembly.

9. The combination according to claim 8 wherein at least one of said pair of splice plate means includes at least two projections transversely offset in opposite directions from the longitudinal axis of said bolt means for limiting the inward longitudinal movement of said bus bars.

* * * * *